DIGITAL CODE CONVERTER

Filed Aug. 21, 1964

INVENTOR
WILLIAM ADLER
BY
Hopgood & Calimafde
ATTORNEYS

DIGITAL CODE CONVERTER

Filed Aug. 21, 1964

2 Sheets-Sheet 2

INVENTOR
WILLIAM ADLER
BY
Hopgood & Calimafde
ATTORNEYS 3,350,708

DIGITAL CODE CONVERTER

William Adler, Westbury, N.Y., assignor to Servo Corporation of America, Hicksville, N.Y., a corporation of New York Filed Aug. 21, 1964, Ser. No. 391,195
10 Claims. (Cl. 340—347)

This invention relates to a code converter for translating information from one digital code to another digital code. Although the invention can be used in connection with many different codes, it is particularly useful as a binary to decimal converter in digital computers and data processing systems.

In digital computers and data processing systems, the binary number system is used almost exclusively because it is much better suited to electronic computing techniques than the decimal number system. When the results of a computation are to be displayed visually, however, the binary number system becomes a handicap because it is less familiar and harder to read than the decimal number system. Therefore, it is customary to translate binary numbers into their decimal equivalents for readout purposes.

In the past, the translation from binary to decimal has been performed in classical decoding circuits, e.g. in diode or transistor logic networks that embody the logical relationship between the binary number system and the decimal number system. These classical decoding circuits are quite effective and reliable in operation, but they are limited to a single, fixed code conversion. In many applications, however, a single code conversion is not sufficient. For example, in computations involving angles from 0 to 360°, it is often the practice to express the angle in a special code to meet accuracy requirements. If the accuracy requirement of the computer is ±0.1%, and the angle is expressed in degrees, the normal error in the binary circuits (± one bit) will limit the accuracy to one part in 360, or ±0.3%, which is inadequate. If the angle is expressed in tenths of a degree, the accuracy will be one part in 3600, or ±0.03%, which is three times better than the required accuracy, but in this case an unduly large number of components will be required to perform the computations. In binary form, the decimal number 3600 contains 12 bits, which means that 12 stage binary registers will be required in the computer circuitry if the angle is expressed in tenths of a degree. By expressing the angle in a special code, however, the required accuracy can be obtained with a 10 bit binary number. If the decimal number 1024 is used to represent 360°, the binary equivalent will exactly fit in a 10 stage binary register and will provide an accuracy of one part in 1024, which is a shade better than the required accuracy of ±0.1%.

Therefore, when an accuracy of ±0.1% is required, the angles will be expressed in a special code where 1023 represents 360°.

Accordingly, in the foregoing examples, the readout problem involves two conversions: (1) conversion from the special binary code to binary degrees, and (2) conversion from binary degrees to decimal degrees. If the output angle is measured in radians rather than degrees, another conversion is required, i.e. conversion from degrees to radians in accordance with the formula $360°=2\pi$ radians. Furthermore, the conversion from the special code and the conversion to radians can only be approximated in classical decoding circuits because of the non-integral relationships involved. In the special code conversion, the input-output ratio is 1 to 2.84, and in the conversion to radians it is 1 to 57.29. Since the classical decoding circuits can only embody integral relations, these ratios would have to be rounded off to whole numbers, thereby adding to the normal error of circuit operation.

In accordance with this invention, however, there has been devised a converter which is capable of making non-integral conversions and which can convert from the above noted special binary code to decimal radians in one simple operation. One embodiment of this invention comprises (1) a binary input counter for receiving the binary input signals, (2) a first pulse generator coupled to the input of the binary counter, (3) a decimal output counter, (4) a second pulse generator coupled to the input of the decimal counter, and (5) means for gating both pulse generators ON after binary information has been applied to the binary input counter and for gating both pulse generators OFF when the binary counter returns to zero. When the pulse generators are gated OFF, the first pulse generator will have produced a train of pulses equal in number to the binary number entered in the input counter. If the frequencies of the two pulse generators are equal, the second pulse generator will have produced the same number of pulses, and the result will be a straight binary to decimal conversion. But by using different frequencies for the first and second pulse generators, non-integral conversions can be made at the same time. For example, to convert from the special code of 1024=360, a frequency ration of 1024/360, or 2.84/1, is employed. To convert from the special code to radians, a frequency ratio of $1024/2\pi$, or 162.89/1, is employed. In general, any desired linear conversion can be made in addition to the binary to decimal conversion by appropriate selection of the frequency ratio between the two pulse generators.

Accordingly, one object of this invention is to provide a digital code converter capable of performing non-integral code conversions.

Another object of this invention is to provide a digital code converter capable of simultaneously performing a plurality of code conversions.

A further object of this invention is to provide a digital code converter capable of simultaneously performing integral and non-integral code conversions.

An additional object of this invention is to provide a digital code converter which can be easily adapted to perform different code conversions.

Another object of this invention is to provide an improved binary to decimal converter for use in digital computers and data processing systems.

Other objects and advantages of the invention will be apparent to those skilled in the art from the following description of two specific embodiments thereof, as illustrated in the attached drawings, in which.

Figure 1:
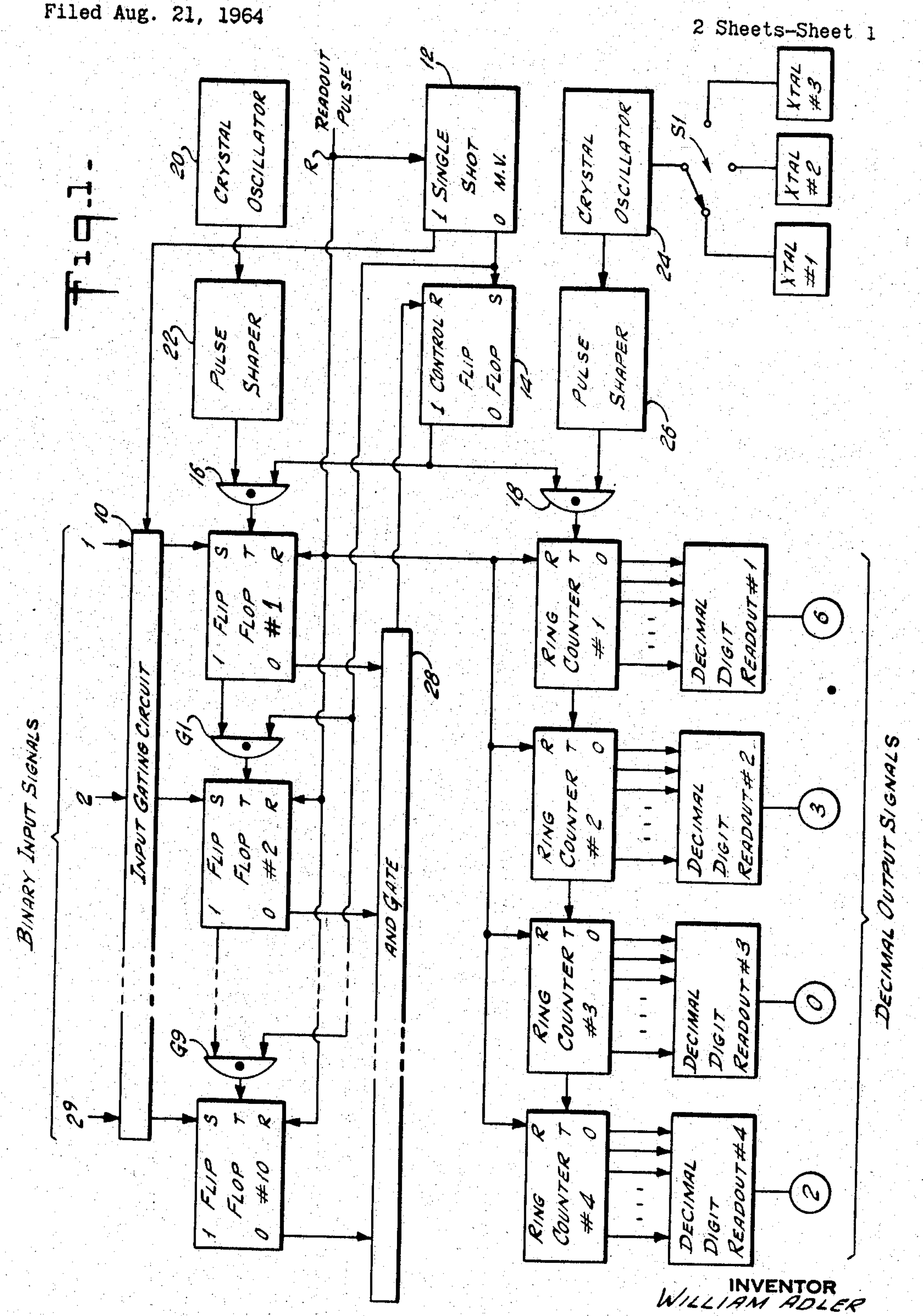
FIG. 1 is a block diagram of a first embodiment of the invention.

FIG. 1 shows an adjustable code converter which can be used to convert from the special binary code of 1024=360 to decimal degrees, or from the special binary code to decimal radians, or from binary numbers to decimal numbers. This embodiment contains a binary input counter comprising flip-flops #1 to #10, which are adapted to receive parallel binary input signals on their S (set) input terminal via an input gating circuit 10. The T (trigger) input terminal of each flip-flop is coupled to the 1 output of the preceding flip-flop via AND gates G1–G9. When gates G1–G9 are enabled, flip-flops #1–#10 act as a binary counter circuit, but when the gates are disabled, the flip-flops act as a binary storage register. This embodiment also contains a decimal output counter comprising ring counters #1–#4, which are coupled together in cascade, and each coupled to a corresponding decimal digit readout. The R (reset) input terminals of ring counters #1–#4 and flip-flops #1–#10 are coupled to a common reset conductor which receives a READ- OUT PULSE to initiate the readout process. The operation of this embodiment can be most easily explained by tracing the sequence of events that occur in response to the READOUT PULSE.

When a READOUT PULSE is applied to conductor R, the input counter and output counter are reset, and a single shot multivibrator 12 is triggered to gate information into the binary input counter via input gating circuit 10. Multivibrator 12 holds gating circuit 10 open for approximately 60 microseconds, during which time gates G1–G9 are disabled. After 60 microseconds have elapsed, multivibrator 12 returns to its stable state, closing gating circuit 10, opening gates G1–G9, and triggering control flip-flop 14, which opens gates 16 and 18. Gate 16 then admits a train of pulses to the binary input counter, and at the same time, gate 18 admits a train of pulses to the decimal output counter. The pulse train for the binary input counter is generated by a crystal oscillator 20 and pulse shaper 22. The pulse train for the decimal output counter is generated in a separate crystal oscillator 24 and pulse shaper 26. The frequency of oscillator 22 can be set to any one of three predetermined frequencies by means of a selector switch S1, for reasons which will be discussed in detail later.

When gates 16 and 18 are opened, the input counter will contain a binary number corresponding to the binary input signals, and the decimal output counter will be empty. As pulses are passed through gates 16 and 18, the input counter begins to count down and the output counter begins to count up. When the input counter returns to zero, control flip-flop 14 is reset by AND gate 28, which is coupled to the 0 output terminal of flip-flop #1–#10. At this time, a pulse train equal to the binary input number will have been passed through gate 16. If the frequencies of oscillators 20 and 24 are equal, the same number of pulses will have been passed through gate 18, and the decimal output counter will contain the decimal equivalent of the binary input number.

The count-down action of the binary input counter is illustrated in Chart A below, which shows the counting sequence of the first four stages of the binary input counter.

CHART A.—COUNTING SEQUENCE OF FIRST FOUR STAGES OF BINARY INPUT COUNTER

| Step Number | Binary Number | | | | Decimal Value |
|---|---|---|---|---|---|
| | 8 | 4 | 2 | 1 | |
| 0 | 0 | 0 | 0 | 0 | 0 |
| 1 | 1 | 1 | 1 | 1 | 15 |
| 2 | 1 | 1 | 1 | 0 | 14 |
| 3 | 1 | 1 | 0 | 1 | 13 |
| 4 | 1 | 1 | 0 | 0 | 12 |
| 5 | 1 | 0 | 1 | 1 | 11 |
| 6 | 1 | 0 | 1 | 0 | 10 |
| 7 | 1 | 0 | 0 | 1 | 9 |
| 8 | 1 | 0 | 0 | 0 | 8 |
| 9 | 0 | 1 | 1 | 1 | 7 |
| 10 | 0 | 1 | 1 | 0 | 6 |
| 11 | 0 | 1 | 0 | 1 | 5 |
| 12 | 0 | 1 | 0 | 0 | 4 |
| 13 | 0 | 0 | 1 | 1 | 3 |
| 14 | 0 | 0 | 1 | 0 | 2 |
| 15 | 0 | 0 | 0 | 1 | 1 |
| 16 | 0 | 0 | 0 | 0 | 0 |

Suppose, for example, that the binary number 0000001001 (decimal value=9) is entered into the binary input counter during the 60 microsecond input interval. The first four stages of the counter would then be at the 7th step of the counting sequence shown in Chart A, and the application of 9 input pulses would return it to zero. If the binary number 0000001101 (decimal value=13) is entered, the first four stages would be at the 3rd step of the counting sequence, and the application of 13 input pulses would return it to zero. In general, a pulse train equal to the binary number in the counter will return the counter to zero for binary numbers 0000000000 (decimal value 0) to 1111111111 (decimal value 1023).

If the frequencies of oscillators 20 and 24 are equal, gate 18 will pass the same number of pulses as gate 16, and the result will be a straight binary to decimal conversion, since the decimal output counter starts at zero and counts up while the binary input counter counts down. By using different frequencies, however, an additional conversion can be made while the binary to decimal conversion is being performed. For example, if the frequency ratio of the two oscillators is 1024 to 360, or 2.84 to 1, the information will be converted from the special binary code of 1024=360° to decimal degrees. If the frequency ratio is 1024 to $2\pi$, or 162.89 to 1, the information will be converted from the special binary code to decimal radians. In this particular embodiment, three crystals are provided for oscillator 24 to allow operation in all three modes of conversion. Crystal #1 is selected to provide a 2.84 to 1 frequency ratio; crystal #2 is selected to provide a 162.89 to 1 frequency ratio, and crystal #3 is selected to provide a 1 to 1 frequency ratio. Therefore, the frequency of crystals #1, #2, and #3 will, of course, depend in part on the frequency selected for oscillator 20.

In the embodiment of FIG. 1, gates G1–G9 are required to prevent interaction betwen the flip-flops during the input time interval. If complementary input numbers are used as an input, however, the counting sequence can be modified to remove the need for gates G1–G9. In this case, the T input of each flip-flop would be coupled to the 0 output terminal of the preceding flip-flop, so that each flip-flop would be triggered when the preceding flip-flop switched from 1 to 0, but not when it switched from 0 to 1. The counting sequence for the first four stages of this modified counter is shown in Chart B below.

CHART B.—COUNTING SEQUENCE OF FIRST FOUR STAGES OF MODIFIED INPUT COUNTER

| Step Number | Binary Number | | | | Decimal Value |
|---|---|---|---|---|---|
| | 8 | 4 | 2 | 1 | |
| 0 | 0 | 0 | 0 | 0 | 0 |
| 1 | 0 | 0 | 0 | 1 | 1 |
| 2 | 0 | 0 | 1 | 0 | 2 |
| 3 | 0 | 0 | 1 | 1 | 3 |
| 4 | 0 | 1 | 0 | 0 | 4 |
| 5 | 0 | 1 | 0 | 1 | 5 |
| 6 | 0 | 1 | 1 | 0 | 6 |
| 7 | 0 | 1 | 1 | 1 | 7 |
| 8 | 1 | 0 | 0 | 0 | 8 |
| 9 | 1 | 0 | 0 | 1 | 9 |
| 10 | 1 | 0 | 1 | 0 | 10 |
| 11 | 1 | 0 | 1 | 1 | 11 |
| 12 | 1 | 1 | 0 | 0 | 12 |
| 13 | 1 | 1 | 0 | 1 | 13 |
| 14 | 1 | 1 | 1 | 0 | 14 |
| 15 | 1 | 1 | 1 | 1 | 15 |
| 16 | 0 | 0 | 0 | 0 | 0 |

If the binary complement of the decimal number 9 is entered in this modified counter, the first four stages would be at the 6th step of the counting sequence shown in Chart B. The application of 9 input pulses would then produce all 1's in the counter. If the binary complement of the decimal number 13 were entered, the first four stages would be at the 2nd step of the counting sequence, and the application of 13 input pulses would produce all 1's. In general. a pulse train equal to the complement of the binary number in the counter will produce all 1's in this modified counting sequence. Needless to say, AND gate 28 would be coupled to the 1 output terminals of the flip-flops in the foregoing modification.

Figure 2:
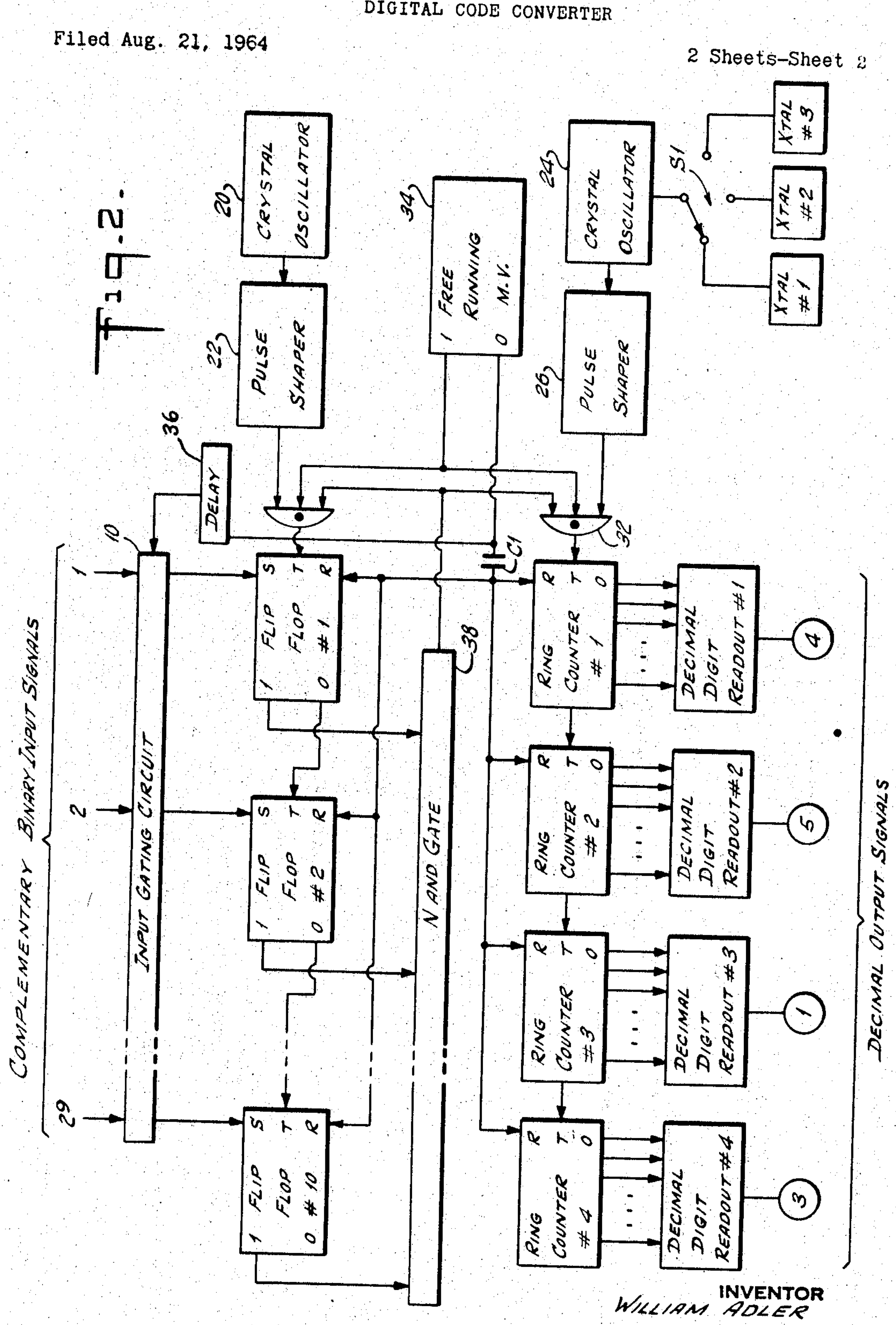
FIG. 2 is a block diagram of a second embodiment of the invention.

FIG. 2 shows a second embodiment of the invention which operates in accordance with the counting sequence of Chart B. No gate circuits between the flip-flops are required in this circuit, because cross-coupling only occurs when one or more of the flip-flops switch from 1 to 0. Before the input signals are applied, the flip-flops are all reset to 0, and since the input signals are applied to the S (set)

terminals of the flip-flops, the flip-flops can only switch from 0 to 1 during input time period.

The embodiment in FIG. 2 contains several other modifications in the switching circuit. Gates 30 and 32, which pass the pulse train into the input and output counters, have three inputs instead of two. These gates are opened when a free running multivibrator 34 is in its 1 state and the input flip-flops #1–#10 *do not* contain all 1's. Gates 30 and 32 close when the input flip-flops contain all 1's. This switching circuit does not require a READOUT PULSE; it is triggered periodically by free running multivibrator 34. When the multivibrator switches from its 1 to 0 state, the input and output counters are reset by a transient pulse coupled through capacitor C1. Input gating circuit 10 opens a short time after the occurrence of the reset pulse due to delay line 36. The binary input signals are then entered into the input counter. When multivibrator 34 switches from 0 state to its 1 state, gates 30 and 32 will be opened if a non-zero binary number has been entered in the input counter. The counting process then commences and continues until a pulse train equal to the binary number has passed through gate 30. At that time, gates 30 and 32 are closed by the output of NAND gate 38. Thus, the counting sequence is automatically initiated every time multivibrator 34 switches from 0 to 1. The frequency of this switching can, of course, be set to any desired value by adjusting the RC time constants in the multivibrator in accordance with well known prior art formulas.

It should be noted that the switching circuit of FIG. 2 could be used in connection with the gated input counter of FIG. 1 if desired, and that the non-gated input counter of FIG. 2 could be used in connection with the switching circuit of FIG. 1 if desired.

From the foregoing description, if will be apparent that this invention provides a digital code converter capable of simultaneously performing integral and non-integral code conversions. And it should be understood that this invention is by no means limited to the specific embodiments disclosed herein, since many modifications can be made in the disclosed structure without departing from the basic teaching of this patent application. For example, the invention is not limited to conversions from binary to decimal. It can be used to convert from binary coded decimal to decimal, or from decimal to binary, or from one binary code to another. In the latter case, of course, a binary output counter would be used in place of the decimal output counter. Furthermore, the invention is not limited to a single output counter; if desired, multiple output counters could be used to simultaneously convert the input code to differing output codes. These and many other modifications of the disclosed structure will be apparent to those skilled in the art, and this invention includes all modifications falling within the scope of the following claims.

What is claimed is:

1. A digital code converter comprising a digital input counter for receiving input information in a first digital code, a digital output counter for producing output information in a second digital code, means for entering digital input information into said input counter, first pulse generator means for applying a first train of pulses to said input counter, second pulse generator means for applying a second train of pulses to said output counter, means for simultaneously initiating said first and second trains of pulses subsequent to the entry of said input information, and means for simultaneously terminating said first and second train of pulses when said input counter reaches a predetermined state, thereby converting said input information from said first digital code to said second digital code.

2. A digital code converter comprising a digital input counter for receiving input information in a first digital code, a digital output counter for producing output information in a second digital code, means for entering digital input information into said input counter, first pulse generator means for producing periodic pulses at a first frequency, second pulse generator means for producing periodic pulses at a second frequency, means for simultaneously applying said first periodic pulses to said input counter and said second periodic pulses to said output counter subsequent to the entry of said input information, and means for simultaneously terminating the periodic pulse input to said input and output counters when said input counter reaches a predetermined state, thereby converting said input information from said first digital code to said second digital code.

3. The combination defined in claim 2 in which said first and second frequencies differ from each other by a predetermined ratio, whereby the conversion of said input information is determined in part by the counting sequence of said input and output counters and in part by said predetermined ratio.

4. The combination defined in claim 3 in which said input and output counters are operable to convert said input information from one general digital code to another in accordance with the counting sequences of the two counters, and in which said first and second pulse generators are operable to convert said input information from one specific digital code to another in accordance with said frequency ratio.

5. A digital code converter comprising a digital input counter for receiving input information in a first digital code, a digital output counter for producing output information in a second digital code, means for entering digital input information into said input counter, first pulse generator means for producing periodic pulses at a first frequency, second pulse generator means for producing periodic pulses at a second frequency, said first and second frequencies being related to each other by a predetermined ratio, gate means coupling the output of said first pulse generator to said input counter and coupling the output of said second pulse generator to said output counter, means for opening said gate means subsequent to the entry of said input information to apply said periodic pulses to said input and output counters, and means for closing said gate means when said input counter reaches a predetermined state to terminate the periodic pulse input to said first and second counters, thereby converting said input information from one general digital code to another in accordance with the counting sequence of the two counters, and converting said input information from one specific digital code to another in accordance with said frequency ratio.

6. The combination defined in claim 5 wherein said input counter is a binary counter and said output counter is a decimal counter, and wherein said frequency ratio is equal to the ratio between first and second measurement units, whereby said input information is converted from a binary number representing a quantity in said first units to a decimal number representing the same quantity in said second units.

7. The combination defined in claim 6 and also including means for varying the frequency of one of said pulse generators to provide different frequency ratios corresponding to the ratios between said first measurement unit and a plurality of different measurement units for the same quantity.

8. The combination defined in claim 7 and also including a plurality of decimal digit readout devices coupled to said digital output counter to provide a visual indication of said decimal number.

9. A binary to decimal converter comprising a binary input counter for receiving binary input information, a decimal output counter for producing decimal output information, means for entering binary input information into said input counter, first pulse generator means for producing periodic pulses at a first frequency, second pulse generator means for producing periodic pulses at a second frequency, said first and second frequencies being related to each other by a predetermined ratio, gate means coupling the output of said first pulse generator to said input counter and coupling the output of said second pulse generator to said output counter, means for opening said gate means subsequent to the entry of said input information to apply said periodic pulses to said input and output counters, and means for closing said gate means when said input counter reaches a predetermined state to terminate the periodic pulse input to said first and second counters, thereby converting said input information from binary to decimal in accordance with the counting sequence of the two counters, and converting said input information from one measurement unit to another in accordance with said frequency ratio.

10. The combination defined in claim 9 wherein said pulse generators each comprise an oscillator and a pulse shaper, and also including means for varying the frequency of one oscillator to provide a plurality of different frequency ratios.

References Cited

UNITED STATES PATENTS

| | | | |
|---|---|---|---|
| 2,808,984 | 10/1957 | Marshall | 340—347 |
| 2,810,518 | 10/1957 | Dillon | 340—347 |
| 3,276,013 | 9/1966 | Chandler | 340—347 |

DARYL W. COOK, *Acting Primary Examiner.*

W. J. KOPACZ, *Assistant Examiner.*